United States Patent [19]

Hauenstein et al.

[11] 4,230,819

[45] Oct. 28, 1980

[54] ELIMINATING ACETALDEHYDE FROM CRYSTALLINE POLYETHYLENE TEREPHTHALATE RESIN

[75] Inventors: Jack D. Hauenstein, Tracy, Iowa; Thomas E. Broderick, Tallmadge, Ohio

[73] Assignee: The Goodyear Tire & Rubber Company, Akron, Ohio

[21] Appl. No.: 29,599

[22] Filed: Apr. 13, 1979

[51] Int. Cl.³ .............................................. C08G 63/74
[52] U.S. Cl. ...................................... 528/483; 264/87; 264/176 F; 528/272
[58] Field of Search .................. 528/272, 483; 264/87, 264/176 F

[56] References Cited

U.S. PATENT DOCUMENTS

| | | |
|---|---|---|
| 4,142,040 | 2/1979 | Jabarin et al. .......................... 528/502 |
| 4,154,920 | 5/1979 | Jabarin .................................. 528/272 |

FOREIGN PATENT DOCUMENTS 2002403  2/1979  United Kingdom .

*Primary Examiner*—Lucille M. Phynes
*Attorney, Agent, or Firm*—J. P. Ward

[57] ABSTRACT

The invention relates to the removal of acetaldehyde from crystalline polyethylene terephthalate granules by passing a dry inert gas through a bed of resin at a temperature of 170° C. to 250° C. for a time sufficient to remove the aldehydes.

3 Claims, No Drawings

ELIMINATING ACETALDEHYDE FROM CRYSTALLINE POLYETHYLENE TEREPHTHALATE RESIN

TECHNICAL FIELD

This invention relates to a method for removing acetaldehyde from polyethylene terephthalate resin. Polyethylene terephthalate polymer generally contains small amounts of acetaldehyde. These relatively small amounts of aldehyde impart a taste to certain soft drinks and fruit juices that may be packaged in a bottle or other container made of polyethylene terephthalate resin containing aldehyde. It is desirable to have plastic bottles made of polyethylene terephthalate resin containing only a very low level of aldehyde or of any other material that may give a taste to a drink bottled therein.

BACKGROUND

Because of the taste aldehyde imparts to liquids stored in polyethylene terephthalate containers, it has been attempted to remove the aldehyde from polyethylene terephthalate resin from which such containers are made. Heating under reduced pressure has been tried but it has not been possible to remove all of the aldehyde from the resin by this method. Hydroxyethyl groups in polyethylene terephthalate are known to break down when exposed to heat and form acetaldehyde. Then new aldehyde is formed and aldehyde that may be removed by heat and reduced pressure is replaced by aldehyde newly generated and the resin is not purified.

DISCLOSURE OF INVENTION

It is known that air or oxygen contacting hot polyester resin causes polyester to discolor and degrade. Aldehyde is formed during such degradation. Now unexpectedly, I have found that when dehumidified or dry air or dry nitrogen gas is passed through a bed of hot resin in a sufficient amount to remove the degradation products from the resin, aldehydes are removed. A series of experiments were run to show the effect of a flow of dry air at various temperatures on the purification of polyethylene terephthalate resins.

PREPARATION OF RESIN

One hundred and fifty pounds of a low molecular weight polyethylene terephthalate polymer having an average degree of polymerization of about three was charged into a reactor equipped with a reflux column and a distilling head. The temperature of the reactor was set at 282° C. and 129.7 pounds of terephthalic acid was charged into the reactor. The reactor was pressurized to 35 psig pressure with nitrogen gas and 35.5 pounds of ethylene glycol was added.

The above mixture was reacted until the head temperature dropped from 140° C. to 110° C.

1,272.3 gram of antimony glycollate was added to the reactor and the batch was transferred to a polymerization vessel using a pressure transducer.

The vacuum cycle was set to decrease the pressure in the vessel at 15 millimeters of mercury pressure a minute. The reaction mixture was agitated and reacted at 270° C. until an intrinsic viscosity of 0.59 was attained. At that point the agitator was stopped and the pressure in the vessel was returned to atmospheric. The batch was then extruded into cold water and chopped into one-eighth inch cube shaped pellets.

The pellets were dried, crystallized by heating at about 240° C. and formed into a bed about 36 inches thick. Dehumidified air was passed through the bed at various temperatures.

Results of a series of tests are shown in Table I below where the acetaldehyde content of the resin is shown after dehumidified air was passed through the bed of resins at various temperatures.

METHOD OF CARRYING OUT THE INVENTION

TABLE I

| Bed of Crystallized Resin Granules | Gas Flow Cu.Ft.Per Min. Dry Air For 8 Hr. | Temperature | Aldehyde Remaining |
|---|---|---|---|
| 36 inches thick | 90 | 170° C. | 7.8 mg/ml × $10^6$ |
| 36 inches thick | 90 | 200° C. | 4.4 mg/ml × $10^6$ |
| 36 inches thick | 90 | 230° C. | 1.5 mg/ml × $10^6$ |

The resin granules can be varied in size, if desired. Cut strands, cut films or other forms can be used. The flow of gas can be varied and generally will be in the range from about 60 cubic feet per minute to about 100 cubic feet per minute. Ninety cubic feet per minute is quite satisfactory.

The examples show removal of aldehyde by passing dry air through a bed of resin. Other dry inert gases such as nitrogen or carbon dioxide can be used to remove aldehyde.

While certain representative embodiments and details have been shown for the purpose of illustrating the invention, it will be apparent to those skilled in this art that various changes and modifications may be made therein without departing from the spirit or scope of the invention.

We claim:

1. The method of removing acetaldehyde from crystalline polyethylene terephthalate resin which comprises passing a dry inert gas through a bed of said resin at a temperature of from about 170° C. to about 250° C. in an amount sufficient to remove acetaldehyde and other degradation products from said resin.

2. The method of claim 1 in which the gas used is dry air.

3. The method of claim 1 in which the gased used is dry nitrogen.